United States Patent
Lanxner et al.

(10) Patent No.: US 8,195,664 B2
(45) Date of Patent: Jun. 5, 2012

(54) METHOD AND SYSTEM FOR CLUSTERING TRANSACTIONS IN A FRAUD DETECTION SYSTEM

(75) Inventors: Eyal S. Lanxner, Modiin (IL); Shay Raz, Ramat-Hasharon (IL); Oren Gross, Even-Yehuda (IL)

(73) Assignee: Symantec Corporation, Mountain View, CA (US)

( * ) Notice: Subject to any disclaimer, the term of this patent is extended or adjusted under 35 U.S.C. 154(b) by 269 days.

(21) Appl. No.: 12/604,220

(22) Filed: Oct. 22, 2009

(65) Prior Publication Data

US 2011/0099169 A1    Apr. 28, 2011

(51) Int. Cl.
G06F 7/00 (2006.01)
(52) U.S. Cl. .......................... 707/737; 707/741; 707/748
(58) Field of Classification Search .................. 707/737, 707/741, 748
See application file for complete search history.

(56) References Cited

U.S. PATENT DOCUMENTS

| | | | |
|---|---|---|---|
| 7,089,592 B2 | 8/2006 | Adjaoute | |
| 7,458,508 B1 | 12/2008 | Shao et al. | |
| 7,523,016 B1 | 4/2009 | Surdulescu et al. | |
| 2006/0010072 A1 | 1/2006 | Eisen | |
| 2006/0101402 A1 | 5/2006 | Miller et al. | |
| 2007/0220595 A1 | 9/2007 | M'Raihi et al. | |
| 2008/0033637 A1 | 2/2008 | Kuhlman et al. | |
| 2008/0046334 A1 | 2/2008 | Lee et al. | |
| 2008/0086409 A1 | 4/2008 | Moorman et al. | |
| 2009/0018940 A1 | 1/2009 | Wang et al. | |
| 2009/0150214 A1 | 6/2009 | Mohan | |
| 2011/0099628 A1 | 4/2011 | Lanxner | |
| 2011/0125658 A1 | 5/2011 | Lanxner | |

FOREIGN PATENT DOCUMENTS

WO    WO 2007/044763    4/2007
WO    WO 2007/095242    8/2007

OTHER PUBLICATIONS

Guha, "ROCK: A Robust Clustering Algorithm for Categorical Attributes," Inf. Syst. 25(5): 345-366 (2000), 25 pages total.
VeriSign Fraud Detection Service [white paper] prepared by VeriSign Authentication Service, dated Mar. 28, 2006, 4 pages total.
VeriSign® Identity Protection (VIP) Fraud Detection Service: Data Sheet [white paper] 2008, 4 pages total.
U.S. Appl. No. 12/604,208, filed Oct. 22, 2009, first named inventor: Eyal S. Lanxner.

*Primary Examiner* — Apu Mofiz
*Assistant Examiner* — Cindy Nguyen
(74) *Attorney, Agent, or Firm* — Morris & Kamlay LLP

(57) ABSTRACT

A method of determining a clustering metric includes receiving a first set of transactions and a second set of transactions. For transaction i of the first set and transaction j of the second set, the method includes (a) determining an intersection set, (b) determining a union set; (c) computing a common linkage between transaction i and transaction j equal to the intersection set divided by the union set, and (d) incrementing index j and repeating steps (a)-(c). The method also includes (e) summing the common linkages between transaction i and the transactions of the second set, (f) normalizing the sum of the common linkages by a number of the second set, and (g) incrementing index i and repeating steps (a)-(f). The method further includes (h) summing the normalized common linkages and (i) normalizing the sum of the normalized common linkages by a number of the first set.

30 Claims, 6 Drawing Sheets

| Transaction | Browser | OS | IP Location | IP Connection |
|---|---|---|---|---|
| 1 | IE | Windows XP | USA CA SF | Road-Runner, fixed |
| 2 | IE | Windows Vista | USA CA LA | Road-Runner, fixed |
| 3 | IE | Windows XP | USA CA SF | Road-Runner, fixed |
| 4 | IE | Windows Vista | USA NY NY | Road-Runner, dail-up |
| 5 | Opera | Mac-OS | Israel Tel-Aviv | Bezek-Ben-Leumi |
| 6 | Opera | Mac-OS | Israel Jerusalem | Bezek-Ben-Leumi | ns in a Fraud Detection System"; and
the instant U.S. patent application Ser. No. 12/604,220, filed on Oct. 22, 2009, entitled "Method and System for Clustering Transactions in a Fraud Detection System".

METHOD AND SYSTEM FOR CLUSTERING TRANSACTIONS IN A FRAUD DETECTION SYSTEM

CROSS-REFERENCES TO RELATED APPLICATIONS

The following two regular U.S. patent applications (including this one) are being filed concurrently, and the entire disclosure of the other application is incorporated by reference into this application for all purposes:
U.S. patent application Ser. No. 12/604,208, filed on Oct. 22, 2009, entitled "Method and System for Weighting Transactions in a Fraud Detection System"; and
the instant U.S. patent application Ser. No. 12/604,220, filed on Oct. 22, 2009, entitled "Method and System for Clustering Transactions in a Fraud Detection System".

BACKGROUND OF THE INVENTION

Identity theft and on-line fraud have become widespread problems in the United States. Each year, many adults in the U.S. have their identities stolen and numerous accounts are compromised, leading to significant losses as a result of identity theft. While the fraud losses themselves are significant, even more worrisome has been the negative impact to enterprises whose consumers have been victim to these breaches. Account churn, lower transaction volume, and even lower stock prices have made the extent of the losses hard to bear for most enterprises.

Weak authentication has led to Internet identity theft, phishing, and on-line financial fraud. As more consumers use computers and mobile devices for shopping, managing their finances, and accessing health care information, the risk of fraud and identity theft increases. Because of the impact of identity theft and on-line fraud on on-line businesses, more and more enterprises are evaluating authentication and security options for their on-line consumer base. This trend to improve security has also been driven by regulatory guidance related to strengthening authentication and security measures.

Fraud detection systems utilize methods and systems to authenticate users in order to secure employee and business-partner access to corporate networks and applications. The risk of enabling unauthorized access to corporate assets justifies the investment and change in behavior needed to deploy strong authentication. Fraud prevention thus enables the enterprise to make a fairly straightforward risk/reward evaluation. However, because these enterprise solutions have been designed for lower volume deployments, utilizing them for securing consumer applications is not entirely feasible. Scaling these enterprise authentication solutions to millions of users in a cost effective manner is nearly impossible.

Accordingly, there is a need in the art for a system and method to improve identity protection for consumers and prevent fraud in on-line transactions.

SUMMARY OF THE INVENTION

The present invention relates generally to computer networks. More specifically, the present invention relates to method and systems for detecting and preventing fraudulent on-line transactions. Merely by way of example, the invention has been applied to a method of clustering transactions based on the number of links shared by transactions. The methods and techniques can be applied to a variety of computer networks and communications systems.

According to an embodiment of the present invention, a method of determining a clustering metric is provided. The method of determining a clustering metric includes receiving a first set of transactions and receiving a second set of transactions. For transaction i of the first set of transactions and transaction j of the second set of transactions, the method includes (a) determining an intersection set consisting of transactions that are neighbors of both transaction i and transaction j, (b) determining a union set consisting of transactions that are neighbors of either transaction i or transaction j, (c) computing a common linkage between transaction i and transaction j equal to the intersection set divided by the union set, and (d) incrementing index j and repeating steps (a)-(c). The method also includes (e) summing the common linkages between transaction i and the transactions of the second set of transactions, (f) normalizing the sum of the common linkages by a number of the second set of transactions, and (g) incrementing index i and repeating steps (a)-(f). The method further includes (h) summing the normalized common linkages between the first set of transactions and the second set of transactions and (i) normalizing the sum of the normalized common linkages by a number of the first set of transactions to determine the clustering metric.

According to another embodiment of the present invention, a method of adding a new transaction to a cluster of n transactions is provided. The method includes receiving the cluster. Each of the n transactions has a group of neighboring transactions. The method also includes receiving the new transaction. The new transaction has one or more neighboring transactions. For transaction j of the n transactions, the method includes (a) determining an intersection set comprising transactions that are neighbors to both the new transaction and transaction j, (b) determining a union set comprising transactions that are neighbors of either the new transaction or transaction j, and (c) computing a common linkage between the new transaction and transaction j. The common linkage is equal to the intersection set divided by the union set. For transaction j, the method also includes (d) forming a sum including the common linkage between the new transaction and the $j^{th}$ transaction of the cluster and (e) incrementing j and repeating steps (a)-(d). Furthermore, the method includes dividing the sum of the common linkages by n to provide a clustering metric, determining that the clustering metric is greater than a clustering threshold, and adding the new transaction to the cluster.

According to a specific embodiment of the present invention, a system for determining a clustering metric is provided. The system includes a data processor and a communications module coupled to the data processor. The system also includes an input/output interface coupled to the data processor and a computer readable medium coupled to the data processor and storing a plurality of instructions for controlling the data processor to determine the clustering metric. The plurality of instructions include instructions that cause the data processor to receive a first set of transactions and instructions that cause the data processor to receive a second set of transactions. The plurality of instructions also include instructions that cause the data processor to initialize a counter i for the first set of transactions and a counter j for the second set of transactions. The plurality of instructions further include instructions that cause the data processor to (a) determine an intersection set consisting of transactions that are neighbors of both transaction i and transaction j, instructions that cause the data processor to (b) determine a union set consisting of transactions that are neighbors of either transaction i or transaction j, instructions that cause the data processor to (c) compute a common linkage between transaction i and transaction j equal to the intersection set divided by the union set, and instructions that cause the data processor to (d) increment index j and repeat steps (a)-(c). The plurality of instructions additionally include instructions that cause the data processor to (e) sum the common linkages between transaction i and the transactions of the second set of transactions, instructions that cause the data processor to (f) normalize the sum of the common linkages by a number of the second set of transactions, and instructions that cause the data processor to (g) increment index i and repeat steps (a)-(f). Moreover, the plurality of instructions include instructions that cause the data processor to (h) sum the normalized common linkages between the first set of transactions and the second set of transactions and instructions that cause the data processor to (i) normalize the sum of the normalized common linkages by a number of the first set of transactions to determine the selection metric.

According to another specific embodiment of the present invention, a system for adding a new transaction to a cluster of n transactions is provided. The system includes a data processor, a communications module coupled to the data processor, an input/output interface coupled to the data processor; and a computer readable medium coupled to the data processor and storing a plurality of instructions for controlling the data processor to add the new transaction to the cluster. The plurality of instructions include instructions that cause the data processor to receive the cluster. Each of the n transactions has a group of neighboring transactions. The plurality of instructions also include instructions that cause the data processor to receive the new transaction. The new transaction has one or more neighboring transactions. The plurality of instructions further include instructions that cause the data processor to initialize a counter j for the n transactions, instructions that cause the data processor to (a) determine an intersection set comprising transactions that are neighbors to both the new transaction and transaction j, instructions that cause the data processor to (b) determine a union set comprising transactions that are neighbors of either the new transaction or transaction j, and instructions that cause the data processor to (c) compute a common linkage between the new transaction and transaction j. The common linkage is equal to the intersection set divided by the union set. The plurality of instructions additionally include instructions that cause the data processor to (d) form a sum including the common linkage between the new transaction and the $j^{th}$ transaction of the cluster and instructions that cause the data processor to (e) increment j and repeat steps (a)-(d). Moreover, the plurality of instructions include instructions that cause the data processor to divide the sum of the common linkages by n to provide a metric, instructions that cause the data processor to determine that the metric is greater than a clustering threshold and instructions that cause the data processor to add the new transaction to the cluster.

Many benefits are achieved by way of the present invention over conventional techniques. For example, embodiments of the present invention provide more accurate clustering of transactions, increasing the accuracy of fraud detection systems. Additionally, embodiments of the present invention provide normalized measures of cluster similarity, enabling comparison between different measurements. Moreover, embodiments of the present invention provide a better criteria measure for transaction clustering. The criteria described herein improves the subject characterization and therefore, improves anomaly detection. Improved anomaly detection improves the performance of the Anomaly Engine along with overall fraud detection.

The goodness measure (GM) described herein has several advantages over traditional techniques. These advantages include GM values that are normalized between zero and one, providing clear insight into whether a specific value is high or low. Another advantage is that in contrast with conventional techniques, which produce a subjective value according to a synthetic parameter (e.g., the expected number of links), the GM described herein generates an objective value based on an objective parameter (e.g., the actual number of links), which is calculated form actual data. Moreover, the GM described herein allows for tuning of the clustering threshold, thereby providing better control of the clustering action. Furthermore, the GM described herein improves the empiric logical performance of the Anomaly Engine in comparison with conventional techniques. These and other embodiments of the invention along with many of its advantages and features are described in more detail in conjunction with the text below and attached figures.

DETAILED DESCRIPTION OF SPECIFIC EMBODIMENTS

Figure 1:
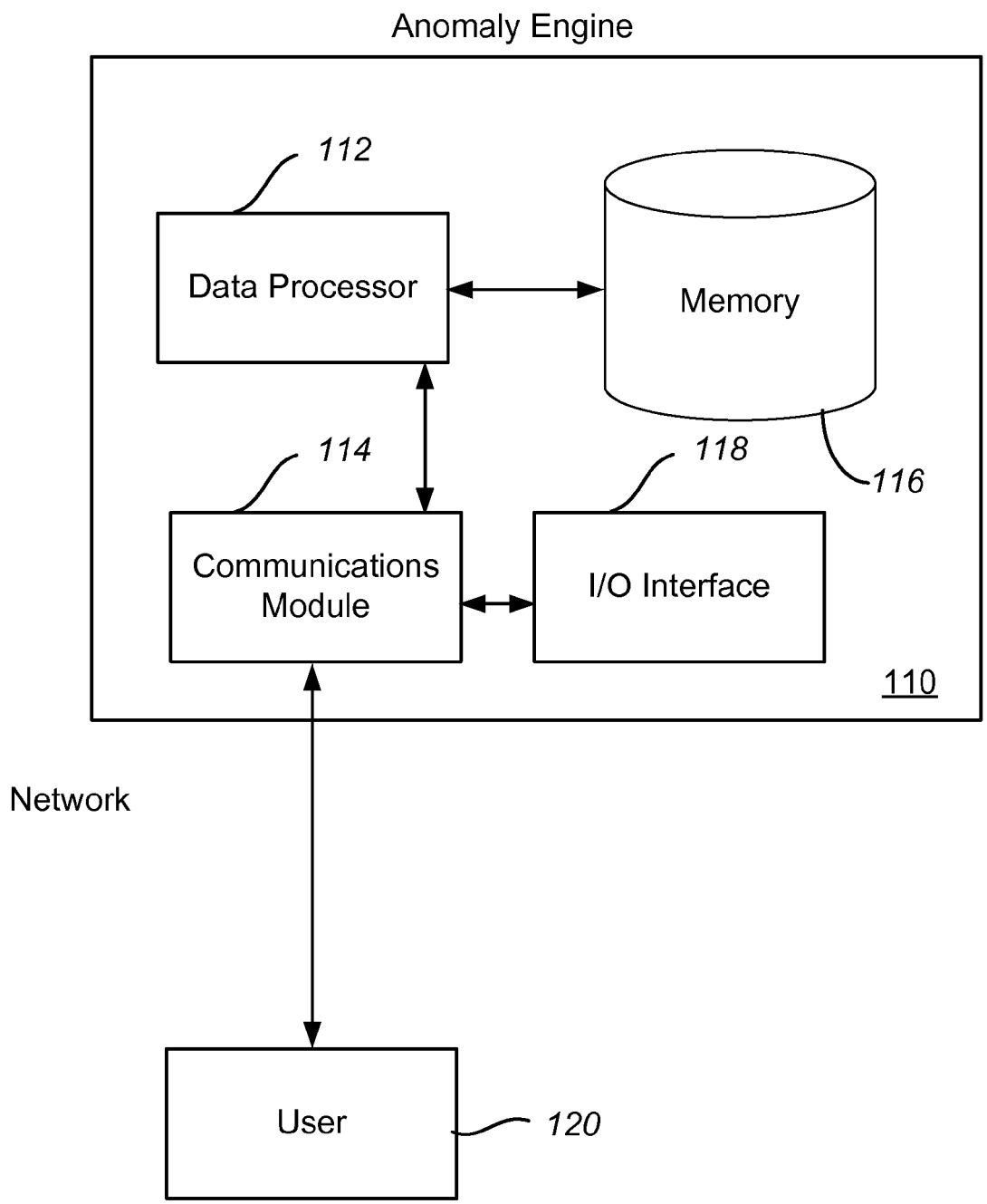
FIG. 1 is a simplified schematic diagram of elements of an anomaly engine according to an embodiment of the present invention.

Embodiments of the present invention can be used to construct models of the behavioral pattern of Internet users and are useful as components of an anomaly engine, also referred to as a behavioral engine. Anomaly engines, in turn, are components of Internet fraud detection and mitigation systems. FIG. 1 is a simplified schematic diagram of elements of an anomaly engine according to an embodiment of the present invention. The anomaly engine 110 includes a processor 112 (also referred to as a data processor), a communications module 114 and a memory 116. The processor 112 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The processor 112 is coupled to the database 116 in order to access the stored information for use during fraud detection processes. The memory (also referred to as a database or a computer readable medium) 116 can be local or distributed as appropriate to the particular application. An input/output interface 118 is provided to facilitate control of the anomaly engine by a system operator. The I/O interface 118 also provides a mechanism for delivering performance reports to a system operator, other suitable personnel, or suitable computer systems.

A user 120 interacts with the anomaly engine 110 through a network, for example, the Internet. Patterns of behavior during on-line transactions are monitored by the anomaly engine, for example, the characteristics of a user log-in from a location such as Mountain View, Calif., using the Firefox browser and the Windows operating system. For this transaction (a log-in transaction), several properties are associated with the transaction including the browser type, the operating system, and the like. Patterns associated with financial transactions such as a money transfer can include a periodicity and a range of amount transferred. Using information related to these behavioral patterns, the anomaly engine can construct a user pattern and identify anomalies in the behavior, which can suggest that a transaction is suspicion if it does not follow the typical behavioral pattern for the particular user.

According to embodiments of the present invention, the measure of the closeness of two clusters, also referred to as a goodness measure, is based on the indirect similarities between the two clusters of interest.

Figure 2:
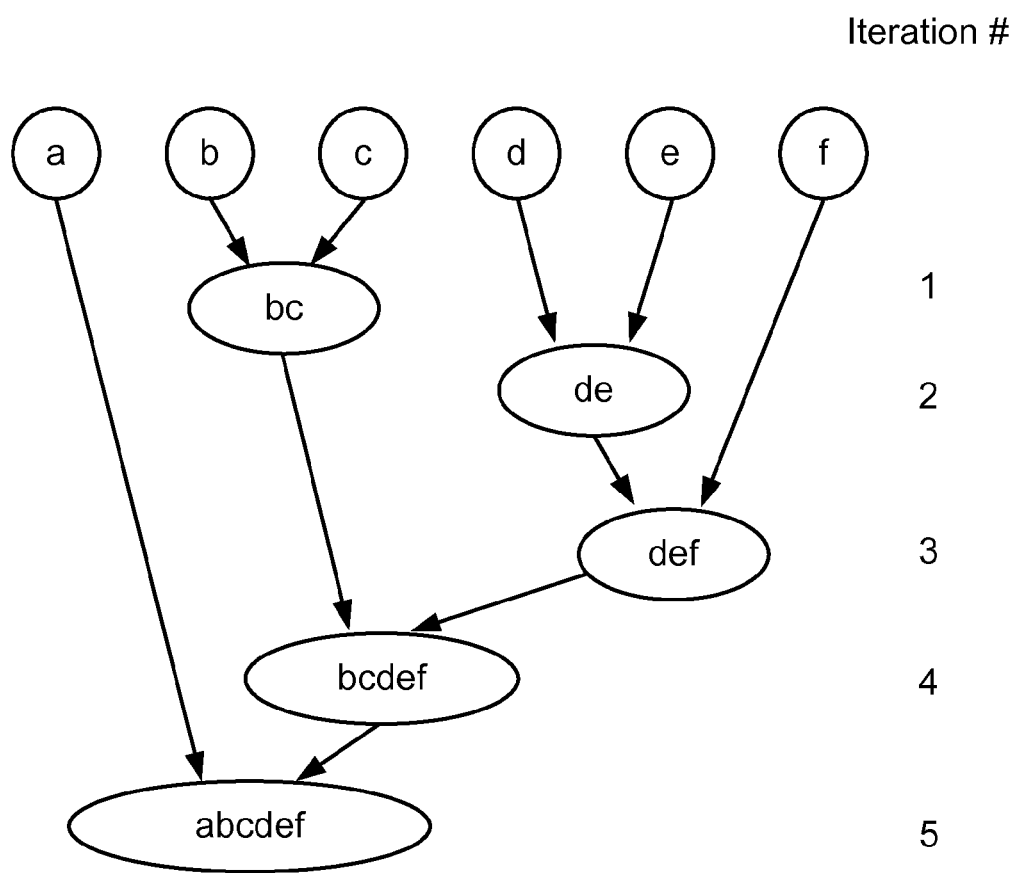
FIG. 2 is a simplified clustering diagram for multiple iterations.

FIG. 2 is a simplified diagram of a method of merging clusters. The diagram illustrated in FIG. 2 is also referred to as a dendrogram. Initially, six clusters, each of the six clusters including one transaction ([a]-[f]), are present. Thus, in this diagram, each transaction is initially a cluster and an agglomerative clustering algorithm is illustrated, in which one or more of the clusters [a]-[f] are successively merged together to form clusters including a greater number of transactions than the original clusters. In each iteration, a clustering metric is used as a measure of the similarity between clusters. The clusters with the greatest similarity will be merged to form a new cluster.

In the first iteration, transactions [b] and [c] are merged together to form a [bc] cluster. In this example, these two transactions have the greatest similarity in comparison with other transaction combinations. In the second iteration, transactions [d] and [e] are merged together to form a [de] cluster. In some situations, the formation of [bc] and [de] can happen sequentially, as illustrated in FIG. 2, or they can be performed concurrently. As described more fully throughout the present specification, the clustering of transactions and clusters is performed based on the measure of the closeness of the clusters (i.e., the goodness measure or clustering metric), which is initially related to the closeness between transactions.

In the third iteration, cluster [de] is merged with transaction [f] to form the [def] cluster. In the fourth iteration, clusters [bc] and [def] are merged to from cluster [bcdef]. In the fifth and last iteration, transaction [a] is merged with cluster [bcdef] to form cluster [abcdef]. This example ends up merging all transactions into a single cluster, but this is not required by embodiments of the present invention. In other embodiments, some transactions will remain as a cluster with a single transaction and other clusters will form with less than the total number of transactions.

Referring to FIG. 2, it should be noted that there are four clusters after the second iteration is completed since the original clusters of a single transaction are present. That is, after the second iteration, the four remaining clusters are: [a], [bc], [de], and [f].

Figure 3:
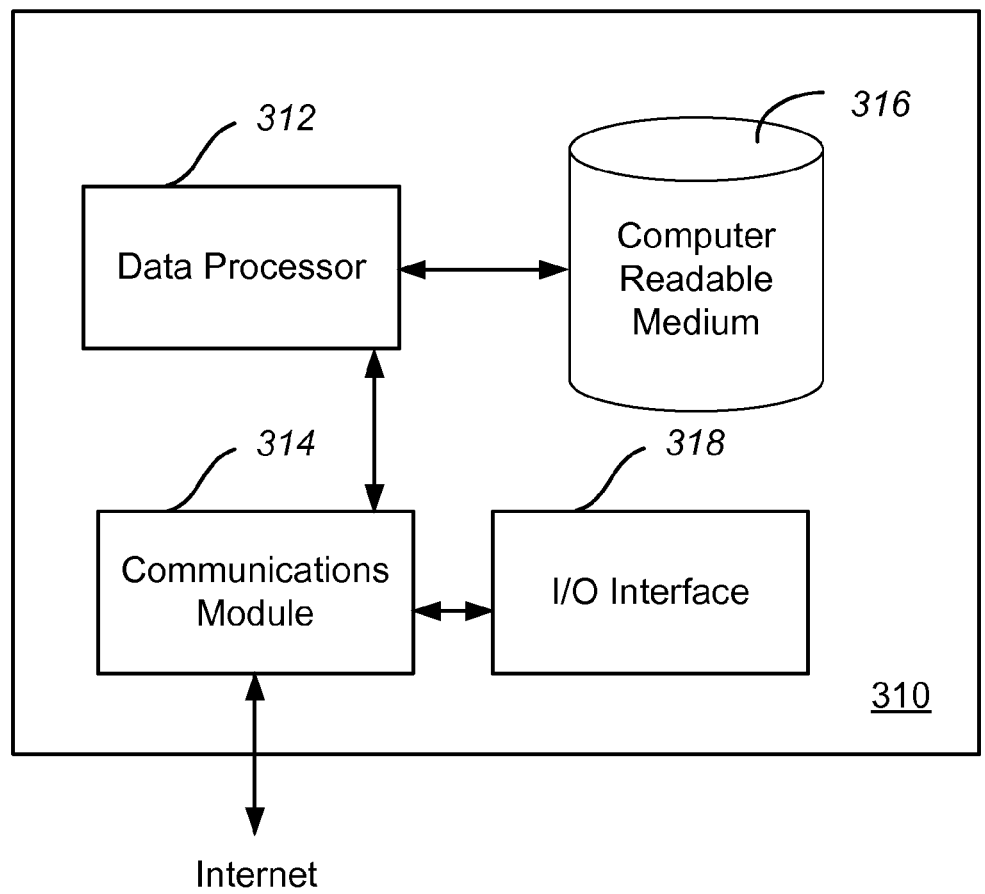
FIG. 3 is a simplified schematic diagram of a system for measuring similarity between transactions according to an embodiment of the present invention.

FIG. 3 is a simplified schematic drawing of a cluster similarity measurement system according to an embodiment of the present invention. The system 310 can be used to compute a clustering metric between two transactions, between a transaction and a cluster, or between two clusters. As discussed above, in some implementations, each transaction is initially a cluster of a single transaction. The clustering metric can also be referred to as a goodness measure or a clustering metric.

Figure 4:
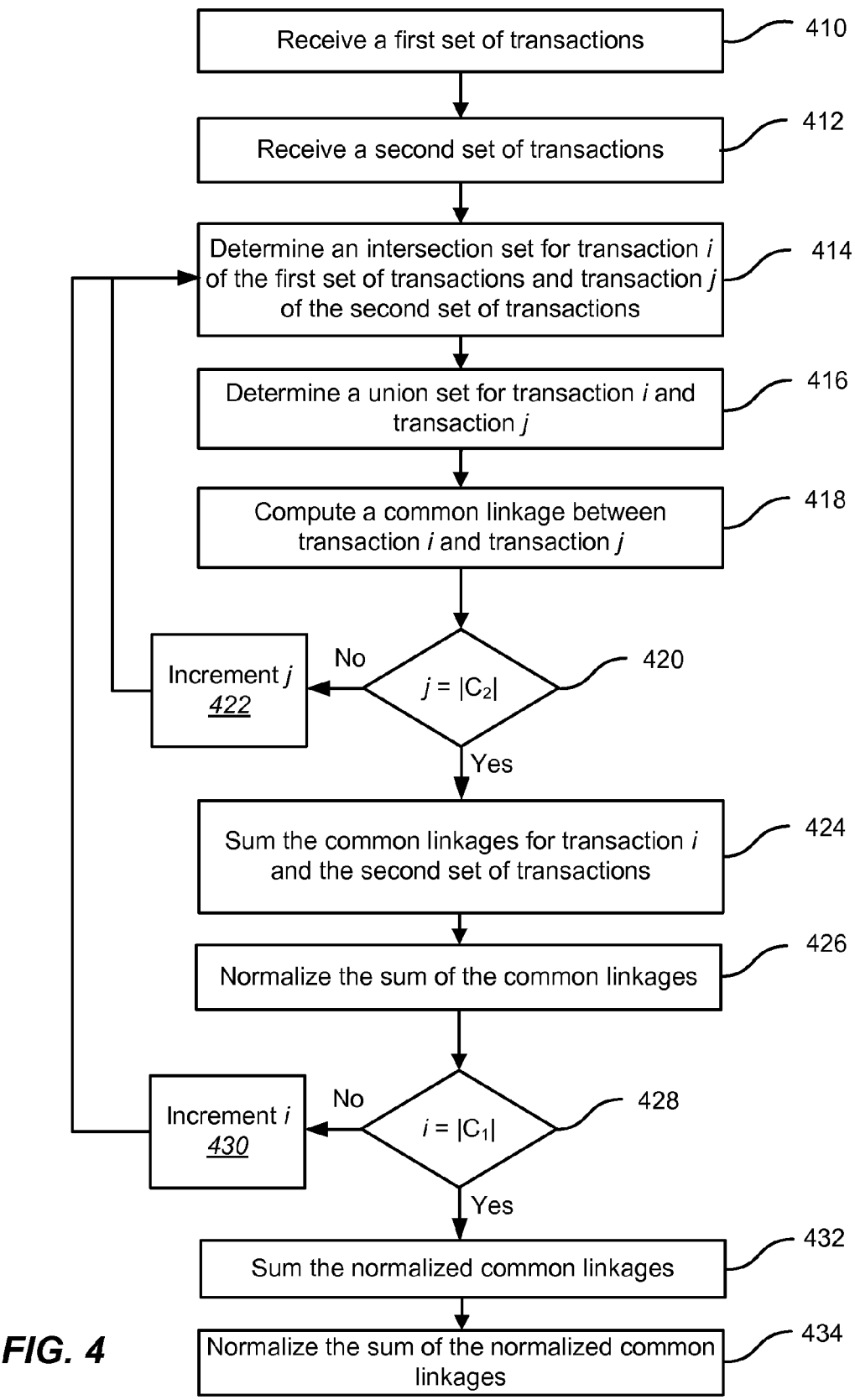
FIG. 4 is a simplified flowchart illustrating a method of determining a clustering metric according to an embodiment of the present invention.
Figure 5:
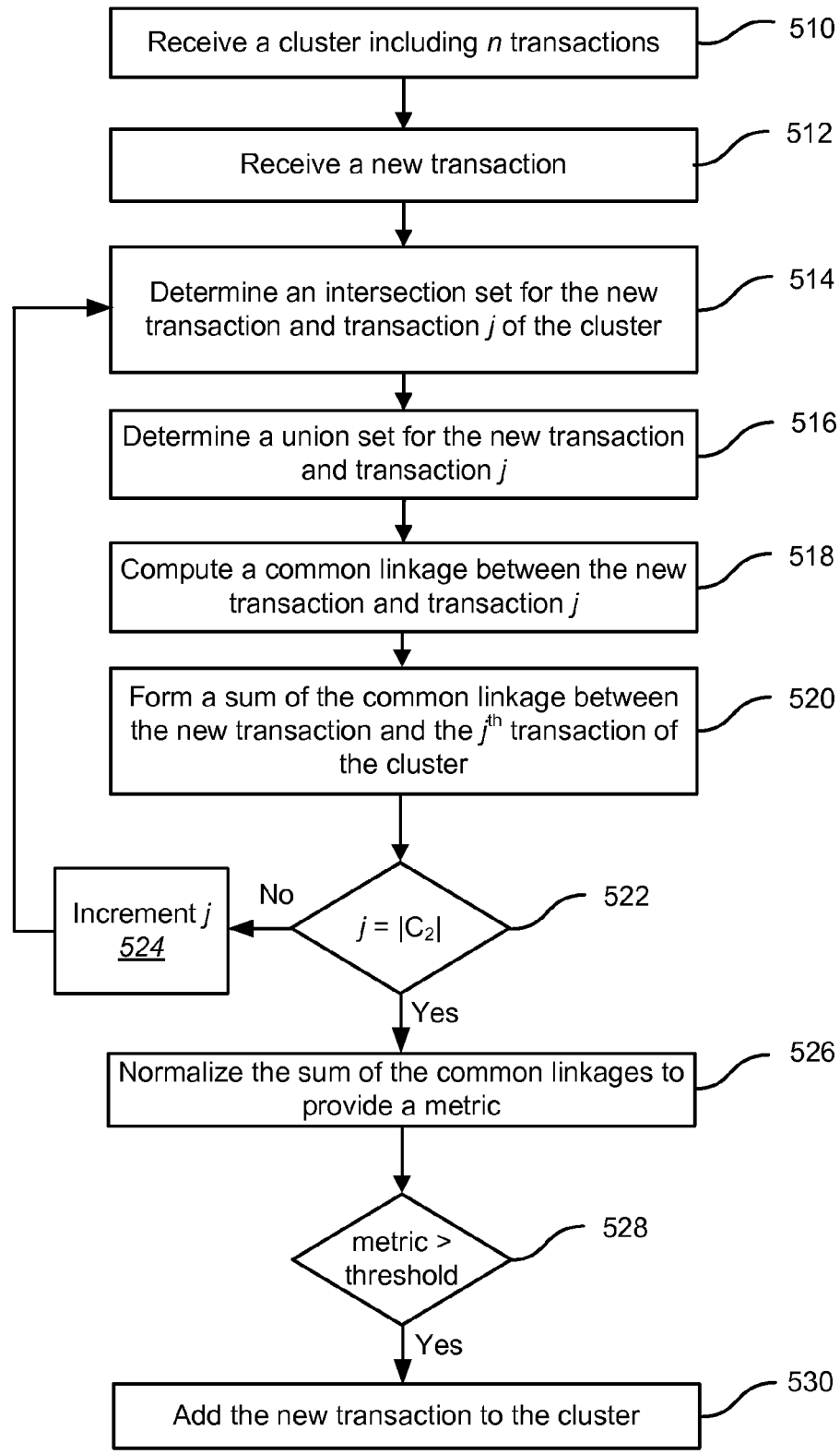
FIG. 5 is a simplified flowchart illustrating a method of adding a transaction to a cluster according to an embodiment of the present invention.
Figures 6A, 6B:
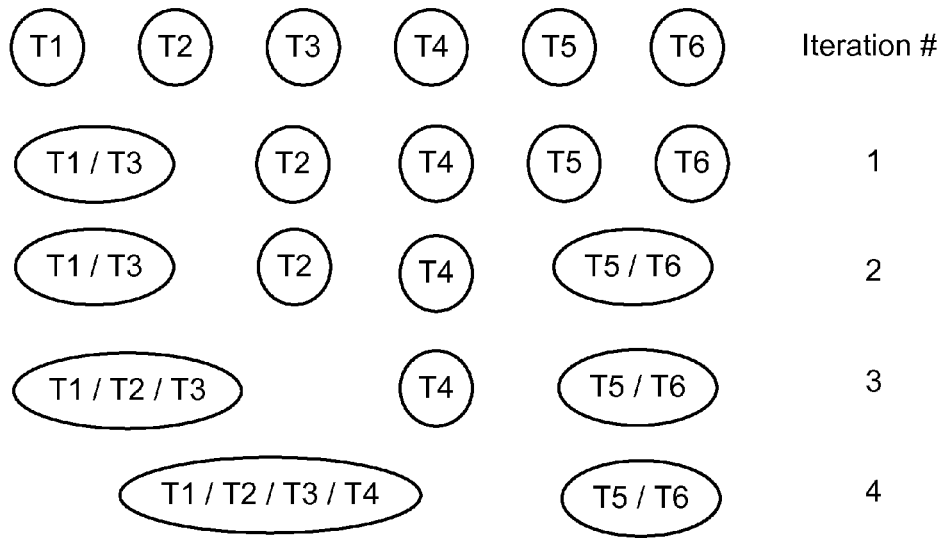
FIG. 6A is a table listing a set of Internet log-in transactions and associated transaction characteristics according to an embodiment of the present invention.
FIG. 6B is a simplified clustering diagram for the Internet log-in transactions listed in FIG. 6A according to an embodiment of the present invention.

The system 310 includes a data processor 312 that is operable to perform computations related to the goodness measure. The data processor 312 can share similar features with processor 112 illustrated in FIG. 1. The system 310 also includes a computer readable medium 316 coupled to the data processor. In an embodiment, the computer readable medium 316 stores a plurality of instructions for controlling the data processor to determine the clustering metric. The instructions, discussed in relation to the methods illustrated in FIG. 4 and FIG. 5 are described in detail in relation to those figures. The computer readable medium 316 can share similar features with the memory 116 illustrated in FIG. 1.

The system 310 also includes a communications module 314 and an input/output interface 318 so that a system operator may provide inputs and receive outputs. In some embodiments, the cluster similarity measurement system 310 is integrated as part of the anomaly engine 110 illustrated in FIG. 1 and in other embodiments, it is a separate component. One of ordinary skill in the art would recognize many variations, modifications, and alternatives.

According to embodiments of the present invention, transactions are analyzed to determine which transactions are neighbors of other transactions. For each set (e.g., a couple) of transactions, a determination is made of whether the transactions included in the set are neighbors. These determinations can be used to construct a neighbor matrix for the transactions, which can be stored in memory, for example, the computer readable medium 316. Given the neighbor matrix or other suitable list of neighbors, it is possible to determine a common linkage between transactions.

As described more fully in the co-pending application reference in paragraph [0001], the similarity between transactions is calculated according to various parameters, such as the browser type and version, the operating system, the IP location, characteristics of the IP connection, and the like. Thus, each transaction will be characterized by several properties, also referred to as fields. These properties include, without limitation, an operating system, a browser type (e.g., Internet Explorer, Firefox, Chrome, or the like) a browser version, an IP address associated with the user's activity, a geographical location of the IP address, or the like. The operating system and browser properties are derivatives of the User-Agent and the geographical location and connection are derivatives of the IP address.

Merely by way of example, information extracted from an IP address can be categorized as geographical location (e.g., country, city, state, longitude, latitude, or the like) and connection information (e.g., Carrier, SLD, Organization, Routing Type, Connection Type, or the like). Properties for login transactions may be User-Agent derivatives (e.g., OS, Browser, or the like) and IP derivatives (e.g., Location, Connection). For money transfer transactions the properties include Amount, Destination institution name, Destination institution country, and Transfer category. For trading, properties include Stock's risk levels, Stock's exchange market, Stock's origin country, Stock's market cap, Stock's industry, or the like. One or more of these properties can be used in the various embodiments described herein.

Once the similarity between transactions has been calculated, a threshold is used to determine which transactions have a similarity value greater than the threshold. The transaction couples with similarity values greater than the predetermined threshold are categorized as neighbors. If the similarity is below the predetermined threshold, the transactions are not considered as neighbors.

Thus, a cluster can include a single transaction and this transaction can have several neighbors. Alternatively, a cluster can include a transaction that has one or more neighbors in the cluster and one or more neighbors outside the cluster. It should be noted that it is possible that two transactions that are not neighbors can be found in the same cluster.

One advantage provided by embodiments of the present invention is that the algorithm is not only based on direct similarities between two transactions of interest, but also considers the overall environment of the transactions by considering the similarities between transactions that are similar to the two transactions of interest, thereby providing a more complete comparison that available using conventional techniques. The clusters of transactions represent a pattern of behavior for the user and can be used to analyze new transactions to determine if they are consistent with the user's pattern of behavior.

By considering the indirect similarities between transactions in a first cluster and a second cluster, embodiments of the present invention consider the overall environment of the transactions, increasing the accuracy of the clustering metric (e.g., the goodness measure) associated with the clusters.

FIG. 4 is a simplified flowchart illustrating a method of determining a clustering metric according to an embodiment of the present invention. The clustering metric is also referred to as a goodness measure. The method includes receiving a first set of transactions (410) and a second set of transactions (412). The sets of transactions can include one or more transactions. The first set of transactions can be a first cluster and the second set of transactions can be a second cluster. Thus, the example given in FIG. 2, where each transaction is initially a cluster, is included within the scope of the present invention. The transactions in the first set and the transactions in the second set will have zero or more neighbors for each transactions. The neighboring transactions can be in located in the sets of transactions or can be transactions outside the sets. Thus, the neighboring transactions can be any of the available transactions. As an example, the first set of transactions and the second set of transactions can be Internet logins. Other transactions are also included with in the scope of the present invention, including money transfer and stock trading transactions. Of course, applications of the present invention are not limited to these particular types of transactions.

The set of transactions that are complementary to the transactions in the first set of transactions and the second set of transactions are retrieved. These complementary transactions will be used in computing common linkages between transactions as more fully described below.

A number of counters are initialized in order to sequentially process the various transactions in the first and second sets of transactions. In the embodiment illustrated in FIG. 4, the following counters are initialized: i=1 and j=1. Additionally two values associated with sums are initialized: $Sum_i=0$ and $Sum_j=0$.

For a first transaction of the first set of transactions (i.e., i=1) and a first transaction of the second set of transactions (i.e., j=1), an intersection set for the two transactions is determined (414). The intersection set is the set of transactions that are neighbors to both the first transaction (i.e., i=1) of the first set and the first transaction (i.e., j=1) of the second set. The neighbors of the first transaction of the first set of transactions and the first transaction of the second set of transactions are determined as discussed in the application referenced in paragraph [0001] or by other suitable methods.

Additionally, a union set is determined for the first transaction of the first set of transactions and the first transaction of the second set of transactions (416). The union set is the set of transactions that are neighbors of either the first transaction of the first set of transactions or the first transaction of the second set of transactions. In a specific embodiment, the number of transactions in the union set is equal to the number of neighbors of the first transaction of the first set of transactions plus the number of neighbors of the first transaction of the second set of transactions.

The common linkage between the first transaction of the first set of transactions and the first transaction of the second set of transactions is computed (418). In general, the common linkage between two transactions $t_1$ and $t_2$ is:

$$CommonLinkage(t_1, t_2) = \frac{|Neighbors(t_1) \cap Neighbors(t_2)|}{|Neighbors(t_1) \cup Neighbors(t_2)|}, \quad (1)$$

that is, the intersection set divided by the union set.

In computing the CommonLinkage between two transactions $t_1$ and $t_2$, the intersection of their common neighbors is divided by the potential number of common neighbors, that is, the union of the common neighbors. As an example, referring to the example shown in FIG. 2, the CommonLinkage will be the intersection of common neighbors (i.e., X2 and X3=>2) divided by the union of common neighbors (i.e., A1, B1, X1, X2, X3=>5). Thus, for this example, the CommonLinkage (A1,B1) equals 2/5, which is a indirect similarity measurement between these two specific transactions.

A determination is made of whether the all of the transactions in the second set of transactions have been considered, that is, if j=$|C_2|$, where $|C_2|$ is the number of transactions in the second set or cluster (420). The counter for the second set of transactions (j) is incremented (422) and steps (414) through (418) are repeated for the remaining transactions in the second set of transactions.

Once all the transactions from the second set of transactions have been considered, the common linkages between the first transaction in the first set of transactions and the transactions in the second set of transactions are summed (424). In some embodiments, the common linkages are summed prior to step (420). One of ordinary skill in the art would recognize many variations, modifications, and alternatives.

The sum of the common linkages is normalized (426). A determination is made if all of the transactions in the first set of transactions have been considered (428). If the counter for the first set of transactions has not reached the number of transactions in the set (i.e., i<$|C_1|$), then the counter (i) is incremented (430) and steps (414) through (426) are repeated for the additional transactions in the first set of transactions.

Once the normalized common linkages have been computed for all of the transactions in the first set of transactions compared to the transactions in the second set of transactions, the normalized common linkages are summed (432) and the sum of the normalized common linkages is normalized (434). This final normalized value is a goodness measure or clustering metric for the two sets of transactions.

It should be appreciated that the specific steps illustrated in FIG. 4 provide a particular method of determining a clustering metric according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

The goodness measure between two groups of transactions represented by C1 and C2 is equal to $G(C_1,C_2)$ as shown in equation (2) and calculated using the method illustrated in FIG. 4. The goodness measure is a metric for the similarity between the transaction groups. As described more fully below, the goodness measure can be used as a criteria in merging transactions to form clusters.

$$G(C_1, C_2) = \frac{\sum_{t_i \in C_1} \frac{\sum_{t_j \in C_2} CommonLinkage(t_i, t_j)}{|C_2|}}{|C_1|}. \quad (2)$$

It will be noted that initially, the process starts with just transactions, each transactions forming a cluster of one. According to an embodiment of the present invention, a clustering action is performed if the goodness measure is greater than a predetermined threshold. As an example, a transaction can be added to a cluster if the value of the goodness measure calculated for the transaction and the cluster using equation (2) is greater than the predetermined threshold. As another example, for a case in which the first set of transactions are included in a first cluster and the second set of transactions are included in a second cluster, a third cluster could be formed including the first cluster and the second cluster based on the similarity between clusters as represented by the goodness measure.

The neighbors of a transaction may be included in a cluster including the transaction, in other clusters, or not in a cluster, but as a single transaction. In an embodiment, transactions that are neighbors of a transaction in the first set of transactions and a transaction in the second set of transactions are defined in relation to a similarity between the transactions.

As discussed above, if the similarity between transactions is higher than a predetermined threshold, then the transactions are considered to be neighbors. The similarity between transactions can be determined in one of several possible methods. One of ordinary skill in the art would recognize many variations, modifications, and alternatives.

In comparison with similarity between transactions, which is defined in terms of neighboring transactions, the measure the closeness of any two clusters is referred to as the goodness measure.

Referring once again to equation 2, in an example where the sets of transactions are clusters of transactions, for each transaction $t_i$ in cluster $C_1$, the average of the common linkages between transaction $t_i$ and each of the transactions in cluster $C_2$ is calculated. As illustrated in equation (2), the sum of the common linkages between a first transaction from the first cluster ($t_i$) and the n transactions of the second cluster ($t_j$, where j=1 . . . n) is computed. In computing this sum, the index j is incremented by the number of transactions in the second cluster (i.e., n). This sum is normalized by dividing by the number of transactions in the second cluster. The second transaction in the first cluster is then considered and the common linkage values between the second transaction in the first cluster and the transactions of the second cluster is then computed.

This second sum is normalized by dividing by the number of transactions in the second cluster. In equation (2), this second sum is represented by the leftmost summation symbol.

In turn, the remaining transactions of the first cluster are used to determine the average common linkage between each of the remaining transactions and the transactions of the second cluster. Once all the transactions of the first cluster have been considered, the sum will be normalized by dividing by the number of transactions in the first cluster. Thus, using equation (2), the average of all the averages is calculated. The absolute value of $C_2$ is equal to the total number of transactions in $C_2$, producing an average as described herein.

Thus, in summary, equation (1) can be used to compute the common linkage between any two transactions. Using equation (2), the common linkages between a first transaction of the first cluster and each transaction of the second cluster are computed and averaged. Repeating this process, the common linkages for the other transactions of the first cluster and each transaction of the second cluster are computed and then averaged to provide the goodness measure for the two clusters.

Initially, prior to any clustering of transactions, each transaction will form its own cluster. The goodness measure between two clusters (initially, between two transactions) can be computed and will be equal to the common linkage between the two transactions. If the goodness measure, equal to the common linkage value, is greater than a predetermined threshold, then the two transactions will be grouped together to form a cluster with two transactions. This is illustrated by the grouping of transactions [b] and [c] into cluster [bc] and transactions [d] and [e] into cluster [de] in iteration #1 of FIG. 1.

In this initial clustering of transactions, the two transactions that have the highest goodness measure will be merged to form the first multi-transaction cluster. Thus, based on the common linkage value for transactions, clustering is performed for transactions with goodness measures higher than the predetermined threshold. In other words, the condition for clustering is that the goodness measure exceeds a predetermined threshold. If the goodness measure between any two transactions does not exceed the predetermined threshold, no clustering will be performed for those two transactions. As noted above, the first cluster will be formed using the transactions with the highest goodness measure value. The next cluster will be formed based on two transactions with the next highest goodness measure or based on the initial cluster and an additional transaction. It should be noted that at each stage, the goodness measure is calculated for each pair of clusters. Over the iterations, the maximum goodness may exceed a maximum value that was previous calculated. Eventually, clusters can be merged if their goodness measure exceeds the predetermined threshold. It will be noted that clustering will stop when the goodness measure between the remaining transactions/clusters fails to exceed the predetermined threshold.

As an example, consider a set of transactions that are completely similar. When clustering is initiated, the goodness measure will be equal to one for a comparison between any two transactions. One of the transaction couples will be merged to form a first cluster. In turn, the remaining transactions will be merged into the first cluster until all transactions are included in the first cluster. As a counter-example, consider two distinct groups of transactions that are not similar to each other. As clustering proceeds, similar transactions from each group will be merged into clusters and eventually each group of transactions will be clustered into a single cluster. However, the two clusters including the two groups of transactions will not be clustered together since the goodness measure between the two clusters will be less than the predetermined threshold. Thus, in this counter-example, the final iteration will result in two clusters.

In an alternative embodiment, the goodness measure is softened by using the maximum common linkage between transactions for every transaction in the first set of transactions to any transaction in the second set of transactions. In this case, equation (2) is modified as shown in equation (3).

$$G'(C_1, C_2) = \frac{\sum_{t_i \in C_1} CommonLinkage(t_i, t_j)}{|C_1|}. \quad (3)$$

FIG. 5 is a simplified flowchart illustrating a method of adding a transaction to a cluster of n transactions according to an embodiment of the present invention. The method includes receiving the cluster. (510). Each of the n transactions in the cluster have a group of neighboring transactions. A new transaction is received (512). The new transaction has one or more neighboring transactions. For each transaction j of the n transactions, a series of steps are performed. (a) An intersection set is determined comprising transactions that are neighbors to both the new transaction and transaction j (514). (b) A union set is determined comprising transactions that are neighbors of either the new transaction or transaction j (516). (c) A common linkage is computed between the new transaction and transaction j (518) The common linkage is equal to the intersection set divided by the union set. (d) A sum is formed including the common linkage between the new transaction and the $j^{th}$ transaction of the cluster (520).

If all of the transactions in the cluster have been analyzed, (j=|C2|), then the method proceeds. If not, then the counter j is incremented and steps (a) through (d) are repeated until all the transactions in the cluster have been analyzed. The sum of the common linkages is divided by the number of transaction in the cluster provide a clustering metric (524). This clustering metric is also referred to as a goodness measure, in this case, between the new transaction and the cluster. If a determination is made that the clustering metric is greater than a clustering threshold (528), then the new transaction is added to the cluster (530).

It should be appreciated that the specific steps illustrated in FIG. 5 provide a particular method of adding a transaction to a cluster of n transactions according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of determining a clustering metric, the method comprising:
    receiving, by a processor, a first set of transactions;
    receiving a second set of transactions; and
    for transaction i of the first set of transactions and transaction j of the second set of transactions:
        (a) determining an intersection set consisting of transactions that are neighbors of both transaction i and transaction };
        (b) determining a union set consisting of transactions that are neighbors of either transaction i or transaction j;
        (c) computing a common linkage between transaction i and transaction j equal to the intersection set divided by the union set;
        (d) incrementing index j and repeating steps (a)-(c);
        (e) summing the common linkages between transaction i and the transactions of the second set of transactions;
        (f) normalizing the sum of the common linkages by a number of the second set of transactions;
        (g) incrementing index i and repeating steps (a)-(f);
        (h) summing the normalized common linkages between the first set of transactions and the second set of transactions; and
        (i) normalizing the sum of the normalized common linkages by a number of the first set of transactions to determine the clustering metric; and
    storing the clustering metric in memory.

2. The method of claim 1 wherein the first set of transactions are included in a first cluster and the second set of transactions are included in a second cluster.

3. The method of claim 2 further comprising forming a third cluster including the first cluster and the second cluster based on the similarity between clusters.

4. The method of claim 2 wherein the neighbors of transaction i and the neighbors of transaction j are not included in the first cluster or the second cluster.

5. The method of claim 2 wherein one or more of the neighbors of 2 transaction i and one or more of the neighbors of transaction j are included in at least one of the first cluster or the second cluster.

6. The method of claim 1 wherein the first set of transactions and the second set of transactions comprise Internet log-ins.

7. The method of claim 1 wherein transactions that are neighbors of both transaction i and transaction/are defined in relation to a similarity between transactions.

8. The method of claim 1 wherein a number of transactions in the union set is equal to neighbors of transaction i plus neighbors of transaction j less the intersection set.

9. A computer-implemented method of adding a new transaction to a cluster of n transactions, the method comprising:
    receiving, by a processor, the cluster, each of the n transactions having a group of neighboring transactions;
    receiving the new transaction, wherein the new transaction has one or more neighboring transactions;
    for transaction j of the n transactions:
        (a) determining an intersection set comprising transactions that are neighbors to both the new transaction and transaction j;
        (b) determining a union set comprising transactions that are neighbors of either the new transaction or transaction j;

(c) computing a common linkage between the new transaction and transaction j, wherein the common linkage is equal to the intersection set divided by the union set;

(d) forming a sum including the common linkage between the new transaction and the $j^{th}$ transaction of the cluster; and (e) incrementing j and repeating steps (a)-(d);

dividing the sum of the common linkages by n to provide a clustering metric;

determining that the clustering metric is greater than a clustering threshold;

adding the new transaction to the cluster; and storing the cluster with the new transaction in memory.

10. The method of claim 9 wherein neighbors of the new transaction and neighbors of transaction j are defined in terms of a similarity between transactions.

11. The method of claim 9 wherein the neighbors of transaction j are not 2 included in the cluster.

12. The method of claim 9 wherein one or more of the neighbors of transaction j are included in the first cluster.

13. The method of claim 9 wherein the new transaction and the cluster of n transactions comprise Internet log-ins.

14. The method of claim 9 wherein transactions that are neighbors of both the new transaction and transaction/are defined in relation to a similarity between transactions.

15. The method of claim 9 wherein a number of transactions in the union set is equal to neighbors of the new transaction plus neighbors of transaction j less the intersection set.

16. A system for determining a clustering metric, the system comprising:

a data processor;

a communications module coupled to the data processor;

an input/output interface coupled to the data processor; and a non-transitory computer readable storage medium coupled to the data processor and storing a plurality of instructions for controlling the data processor to determine the clustering metric, the plurality of instructions comprising:

instructions that cause the data processor to receive a first set of transactions;

instructions that cause the data processor to receive a second set of transactions;

instructions that cause the data processor to initialize a counter i for the first set of transactions and a counter j for the second set of transactions;

instructions that cause the data processor to (a) determine an intersection set consisting of transactions that are neighbors of both transaction i and transaction j;

instructions that cause the data processor to (b) determine a union set consisting of transactions that are neighbors of either transaction i or transaction j;

instructions that cause the data processor to (c) compute a common linkage between transaction i and transaction j equal to the intersection set divided by the union set;

instructions that cause the data processor to (d) increment index j and repeat steps (a)-(c);

instructions that cause the data processor to (e) sum the common linkages between transaction i and the transactions of the second set of transactions;

instructions that cause the data processor to (f) normalize the sum of the common linkages by a number of the second set of transactions;

instructions that cause the data processor to (g) increment index i and repeat steps (a)-(f);

instructions that cause the data processor to (h) sum the normalized common linkages between the first set of transactions and the second set of transactions; and instructions that cause the data processor to (i) normalize the sum of the normalized common linkages by a number of the first set of transactions to determine the selection metric.

17. The system of claim 16 wherein the first set of transactions are included in a first cluster and the second set of transactions are included in a second cluster.

18. The system of claim 17 further comprising forming a third cluster including the first cluster and the second cluster based on the similarity between clusters.

19. The system of claim 17 wherein the neighbors of transaction i and the neighbors of transaction j are not included in the first cluster or the second cluster.

20. The system of claim 17 wherein one or more of the neighbors of transaction i and one or more of the neighbors of transaction j are included in at least one of the first cluster or the second cluster.

21. The system of claim 16 wherein the first set of transactions and the second set of transactions comprise Internet log-ins.

22. The system of claim 16 wherein transactions that are neighbors of both transaction i and transaction/are defined in relation to a similarity between transactions.

23. The system of claim 16 wherein a number of transactions in the union set is equal to neighbors of transaction i plus neighbors of transaction j less the intersection set.

24. A system for adding a new transaction to a cluster of n transactions, the system comprising:

a data processor;

a communications module coupled to the data processor;

an input/output interface coupled to the data processor; and a non-transitory computer readable storage medium coupled to the data processor and storing a plurality of instructions for controlling the data processor to add the new transaction to the cluster, the plurality of instructions comprising:

instructions that cause the data processor to receive the cluster, each of the n transactions having a group of neighboring transactions;

instructions that cause the data processor to receive the new transaction, wherein the new transaction has one or more neighboring transactions;

instructions that cause the data processor to initialize a counter j for the n transactions:

instructions that cause the data processor to (a) determine an intersection set comprising transactions that are neighbors to both the new transaction and transaction j;

instructions that cause the data processor to (b) determine a union set comprising transactions that are neighbors of either the new transaction or transaction j;

instructions that cause the data processor to (c) compute a common linkage between the new transaction and transaction j, wherein the common linkage is equal to the intersection set divided by the union set;

instructions that cause the data processor to (d) form a sum including the common linkage between the new transaction and the jth transaction of the cluster; and instructions that cause the data processor to (e) increment j and repeat steps (a)-(d);

instructions that cause the data processor to divide the sum of the common linkages by n to provide a metric;

instructions that cause the data processor to determine that the metric is greater than a clustering threshold; and instructions that cause the data processor to add the new transaction to the cluster.

25. The system of claim 24 wherein neighbors of the new transaction and neighbors of transaction j are defined in terms of a similarity between transactions.

26. The system of claim 24 wherein the neighbors of transaction j are not included in the cluster.

27. The system of claim 24 wherein one or more of the neighbors of transaction j are included in the first cluster.

28. The system of claim 24 wherein the new transaction and the cluster of n transactions comprise Internet log-ins.

29. The system of claim 24 wherein transactions that are neighbors of both the new transaction and transaction/are defined in relation to a similarity between transactions.

30. The system of claim 24 wherein a number of transactions in the union set is equal to neighbors of the new transaction plus neighbors of transaction j less the intersection set.

* * * * *